US006985972B2

(12) United States Patent
Dieffenderfer et al.

(10) Patent No.: US 6,985,972 B2
(45) Date of Patent: Jan. 10, 2006

(54) DYNAMIC CACHE COHERENCY SNOOPER PRESENCE WITH VARIABLE SNOOP LATENCY

(75) Inventors: James Norris Dieffenderfer, Apex, NC (US); Bernard Charles Drerup, Austin, TX (US); Jaya Prakash Subramaniam Ganasan, Youngsville, NC (US); Richard Gerard Hofmann, Apex, NC (US); Thomas Andrew Sartorius, Raleigh, NC (US); Thomas Philip Speier, Holly Springs, NC (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/264,163

(22) Filed: Oct. 3, 2002

(65) Prior Publication Data

US 2004/0068595 A1   Apr. 8, 2004

(51) Int. Cl.
  *G06F 13/28* (2006.01)
  *G06F 12/00* (2006.01)
(52) U.S. Cl. .......................... 710/22; 710/305; 711/146
(58) Field of Classification Search ................. 710/22, 710/305, 308; 711/146, 100, 152, 154

See application file for complete search history.

(56) References Cited

U.S. PATENT DOCUMENTS

| 5,404,489 | A  | * | 4/1995  | Woods et al.    | 711/152 |
| 5,446,863 | A  | * | 8/1995  | Stevens et al.  | 711/100 |
| 6,353,867 | B1 | * | 3/2002  | Qureshi et al.  | 710/305 |
| 6,748,463 | B1 | * | 6/2004  | Tsuboi et al.   | 710/22  |
| 6,834,378 | B2 | * | 12/2004 | Augsburg et al. | 716/6   |

OTHER PUBLICATIONS

The CoreConnect Bus Architecture, IBM, 1999.*

* cited by examiner

*Primary Examiner*—Khanh Dang
(74) *Attorney, Agent, or Firm*—Robert M. Carwell; Diana R. Gerhardt; Dillon & Yudell LLP (57) ABSTRACT

A data processing system with a snooper that is capable of dynamically enabling and disabling its snooping capabilities (i.e., snoop detect and response). The snooper is connected to a bus controller via a plurality of interconnects, including a snooperPresent signal, a snoop response signal and a snoop detect signal. When the snooperPresent signal is asserted, subsequent snoop requests are sent to the snooper, and the snooper is polled for a snoop response. Each snooper is capable of responding at different times (i.e., each snooper operates with different snoop latencies). The bus controller individually tracks the snoop response received from each snooper with the snooperPresent signal enabled. Whenever the snooper wishes to deactivate its snooping capabilities/operations, the snooper de-asserts the snooperPresent signal. The bus controller recognizes this as an indication that the snooper is unavailable. Thus, when the bus controller broadcasts subsequent snoop requests, the bus controller does not send the snoop request to the snooper.

20 Claims, 5 Drawing Sheets

DYNAMIC CACHE COHERENCY SNOOPER PRESENCE WITH VARIABLE SNOOP LATENCY

BACKGROUND OF THE INVENTION

1. Technical Field

The present invention relates generally to computer systems and in particular to data operations within a multiprocessor computer system. Still more particularly, the present invention relates to a method, system, and data processing system for handling data snoop operations within a multiprocessor computer system.

2. Description of the Related Art

The computer industry has made significant developments in integrated circuit (IC) technology in recent years. For example, ASIC (application specific integrated circuit) technology has evolved from a chip-set philosophy to an embedded core based system-on-a-chip (SoC) concept. The system-on-a-chip concept refers to a system in which, ideally, all the necessary integrated circuits are fabricated on a single die or substrate. An SoC IC includes various reusable functional blocks, such as microprocessors, interfaces (e.g., external bus interface), memory arrays, and DSPs (digital signal processors). Such pre-designed functional blocks are commonly called "cores".

With a SoC, processed requests are sent from a core referred to as an initiator to a target (which may also be a core). An initiator (or master or busmaster as it is sometimes called) is any device capable of generating a request and placing that request on the system bus to be transmitted to a target. Thus, for example, either a processor or DMA controller may be an initiator.

Some initiators, called "caching-initiators", internally cache copies of the contents stored in the targets. Notably, initiators are also typically able to snoop requests issued on the system bus by other initiators. To maintain data coherency between the cached values and the values stored in the targets, caching-initiators have a snoop port for snooping the contents of the cache when other initiators access the targets. Certain requests made by initiators may be "snoopable" by other initiators. Snoopable requests are delivered to one or more targets and are also broadcast to all the caching-initiators via the "snoop" bus. A "snooper" is the portion of a caching-initiator that attaches to the snoop bus. In current art, all "snoopers" of systems that support variable latency are required to provide a response to snoopable requests.

The system bus consists of an interface to the caching-initiators and a separate interface to the targets and logic between the interfaces. The logic between the interfaces is called a "bus controller". This configuration is typical among system-on-a-chip (SoC) buses, where all the initiators, targets and the bus controller are on the same chip (die). In order to complete the connections between initiators and targets, the SoC includes an on-chip bus utilized to connect multiple initiators and targets. This bus is referred to as processor local bus (PLB) and has associated logic, PLB Macro. The "PLB Macro" is a block of logic that acts as the bus controller, interconnecting all the devices (i.e., initiators and targets) of the SoC.

The bus controller consists of a "request queue", an arbiter, routing logic and miscellaneous buffering and registering logic. The "request queue" is a FIFO that holds a multitude of pending requests from an initiator. Requests, including snoopable requests, are pipelined by the initiators into the "request queue" of the bus controller. This means that a new request is sent by the initiator before any response is received for previous sent requests. Each request queue sends its output (the oldest request) to the arbiter. The arbiter selects which request is "granted" from among the pending requests from each of the request queues. When a request is "granted", it is broadcasted to the snoopers and the targets. The routing logic directs the appropriate signals to/from the initiator associated with the granted request and the appropriate target.

Processors often utilize a mechanism known as hardware enforced cache coherency to ensure consistency of data when multiple processors cache the contents of main memory. A portion of this mechanism is known as "snooping". When a processor makes an access to main memory, that access is first broadcast to all the other processors (the "snooping processors") as a "snoop request" by a central resource (the "PLB Macro"). The snooping processors react to the snoop request by returning a snoop result that indicates the state of that processor's cache for the address provided with the snoop request. The "PLB Macro" receives all the snoop results and takes one of several possible actions based on the values of the snoop results.

Typically, all processors continuously snoop all main memory accesses to ensure data consistency. However, there are often cases when a processor doesn't need to or can not participate in snooping. The processor may be in one of several operating modes that prevent snooping. For example, the processor may be (1) executing non-shared code; (2) executing code in which data consistency is maintained by software (rather than hardware); (3) idle due to a temporary lack of work; or (4) undergoing a "soft reset" (resetting an individual processor while the remainder of the system continues to operate). There may be other reasons as well.

With current implementations, when a snoop request is broadcasted, all of the snoopers are expected to respond. Thus, the PLB macro waits until it receives a response from each snooper before proceeding with the task. This is done because the snoopers are allowed variable time for snooping. Notably, the current systems, in which all snoopers respond in a fixed time, do not require this feature. If any of the snoopers fails to provide a response, the bus controller continues polling that snooper for a response indefinitely causing the system to stall. Further, if bus traffic continues when a processor stops snooping, that processor's cache typically must be flushed and invalidated to ensure data consistency.

The present invention recognizes that in the above cases, it would be desirable to allow a processor to not snoop, while the other processors continue to snoop without stalling the entire system. A method and system where bus traffic continues while processors dynamically disable and re-enable snooping would be a welcomed improvement. It would be further desirable to provide a mechanism to ensure the system does not get stuck (stall) waiting for a snoop result that is never going to come because a snoop request is sent to a snooping processor while the processor is not snooping.

SUMMARY OF THE INVENTION

Disclosed is a data processing system with a snooper that is capable of dynamically enabling and disabling its snooping capabilities (i.e., snoop detect and response). The snooper is connected to a bus controller via a plurality of interconnects, including a snooperPresent signal, a snoop response signal and a snoop detect signal. When the snooperPresent signal is asserted, subsequent snoop requests are sent to the snooper, and the snooper is polled for a snoop response. Whenever the snooper wishes to deactivate its snooping capabilities/operations, the snooper de-asserts the snooperPresent signal. The bus controller recognizes this as an indication that the snooper is unavailable. Thus, when the bus controller broadcasts subsequent snoop requests, the bus controller does not send the snoop request to the snooper.

Also, the bus controller waits for a snoop response from only those snoopers that are available (i.e., those with snooperPresent enabled). Each snooper is capable of responding at different times (i.e., each snooper operates with different snoop latencies). The bus controller contains a tracking register by which the bus controller determines when all the snoop responses have been received. To account for the snoopers that are unavailable, the bus controller marks their respective locations in the tracking register as completed.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN
ILLUSTRATIVE EMBODIMENT

The present invention provides a novel method and system for dynamically enabling and disabling snooping by a processor within a multiprocessor data processing system. The invention solves the problems inherent in current systems that support variable snoop latency, where the systems stall because it is waiting on a snoop response from a processor that is not currently snooping and which does not need to be polled for a snoop response to a broadcasted snoop operation.

In standard operating mode of the data processing system described herein, all processors continuously snoop all main memory accesses to ensure data consistency. However, the invention recognizes that there are often cases when a processor does not need to or can not participate in snooping. For example, the processor may be (1) executing non-shared code, (2) executing code in which data consistency is maintained by software (rather than hardware), or (3) undergoing a "soft reset" (resetting an individual processor while the remainder of the system continues to operate). The processor may also be idle due to a temporary lack of work. Additional reasons may exist that support allowing a processor to not snoop, while the other processors continue to snoop.

The present invention provides a mechanism to ensure the system does not get stuck (hung) waiting for a snoop result when a snoop request is sent to a snooping processor while that processor is not snooping. The invention allows bus traffic to continue while snoopers/processors dynamically activate and deactivate their snooping capability. With a large number of processors present, allowing one or more of the processors to not snoop a request result is considerable power savings and increased efficiency in snoop processing.

The invention is described with specific reference to a System on a chip (SoC); However, the various features of the invention are fully applicable to any multiprocessor system that supports processor snoops for coherency operation. Also, for illustrative purposes, the invention is described as enabling and disabling snooping by a processor. However, all functions described as supported by a "processor" may also be done with any type of snooping bus master. The invention is implemented in computer systems that consist of two or more processors (which may be referred to as initiators, according to SoC terminology, or snoopers) and a memory system that includes a main memory and several processor caches. Memory subsystem and processors are interconnected via a system bus/interconnect. In SoC, the system bus consists of an interface to the initiator(s) and a separate interface to the targets. In other multi-processor systems (i.e., not a SoC) the system bus may refer to a bus interconnect and/or a switch. The SoC system bus also consists of logic between the interfaces called a "bus controller" (or PLB macro in a SoC).

Figure 1:
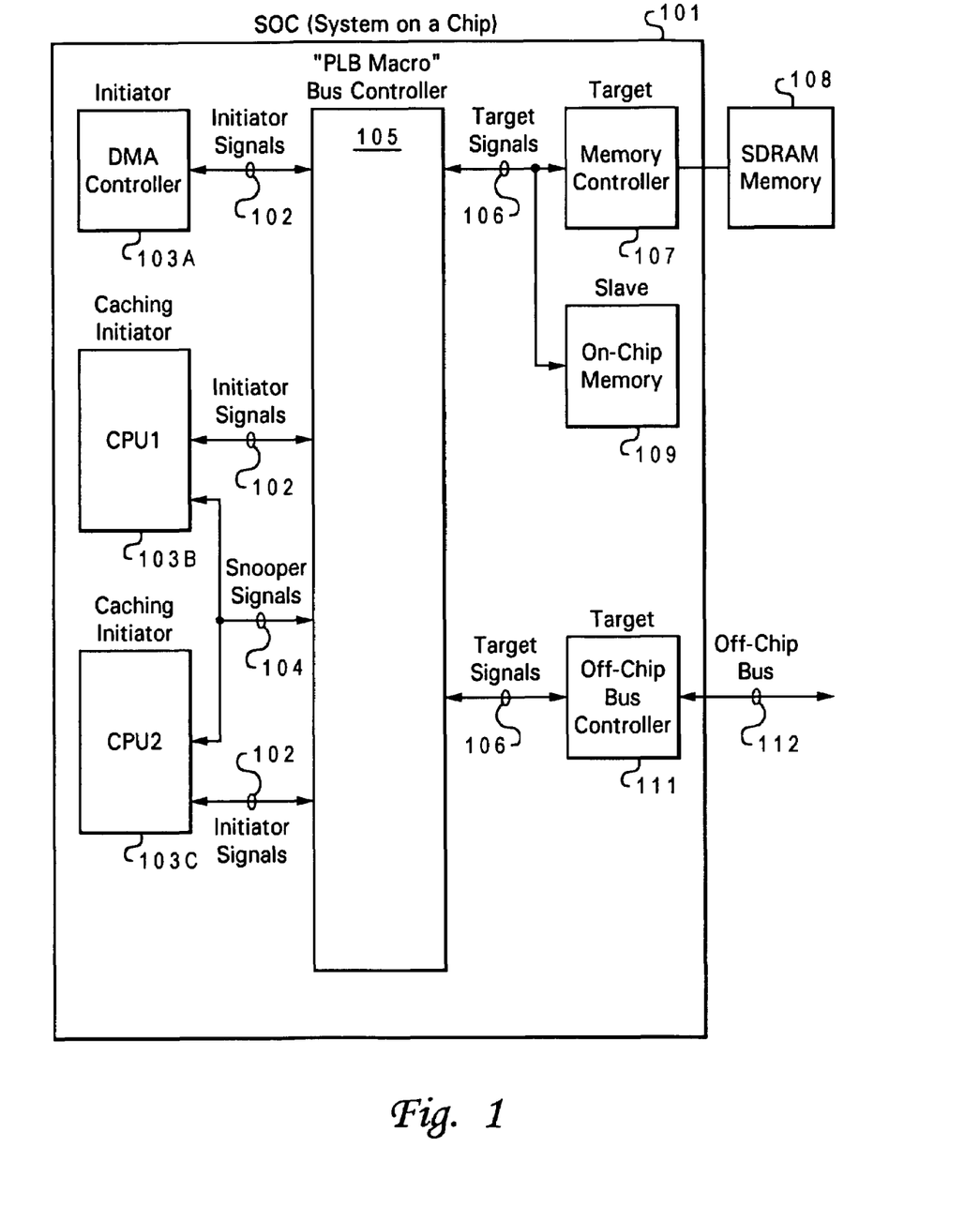
FIG. 1 is a block diagram illustrating major components of a system on a chip (SoC) within which the features of the present invention may advantageously be implemented.

In the illustrative embodiment, the computer system is a system-on-a-chip (SoC) operating with processor local bus (PLB) 5 and PLB5 macro. FIG. 1 illustrates a SoC in which the features of the invention may be implemented. SoC 101 comprises several initiators, targets and the bus controller, all fabricated on the same chip (die). As shown, initiators include direct memory access (DMA) controller 103A and two embedded processor cores CPU1 103B and CPU2 103C. Generated initiator requests 102 connect to processor local bus (PLB) controller (PLB Macro) 105, which arbitrates and connects target signals 106 to their respective destination target. As shown, the destination targets are one of a memory controller 107, which is coupled to and controls access to off-chip (i.e., external to SoC) memory, such as SDRAM 108 (synchronous dynamic random access memory), an on-chip memory 109, or an off-chip bus controller 111. The latter target 111 has an associated off chip bus 112 by which it connects to off-chip components.

Figure 2:
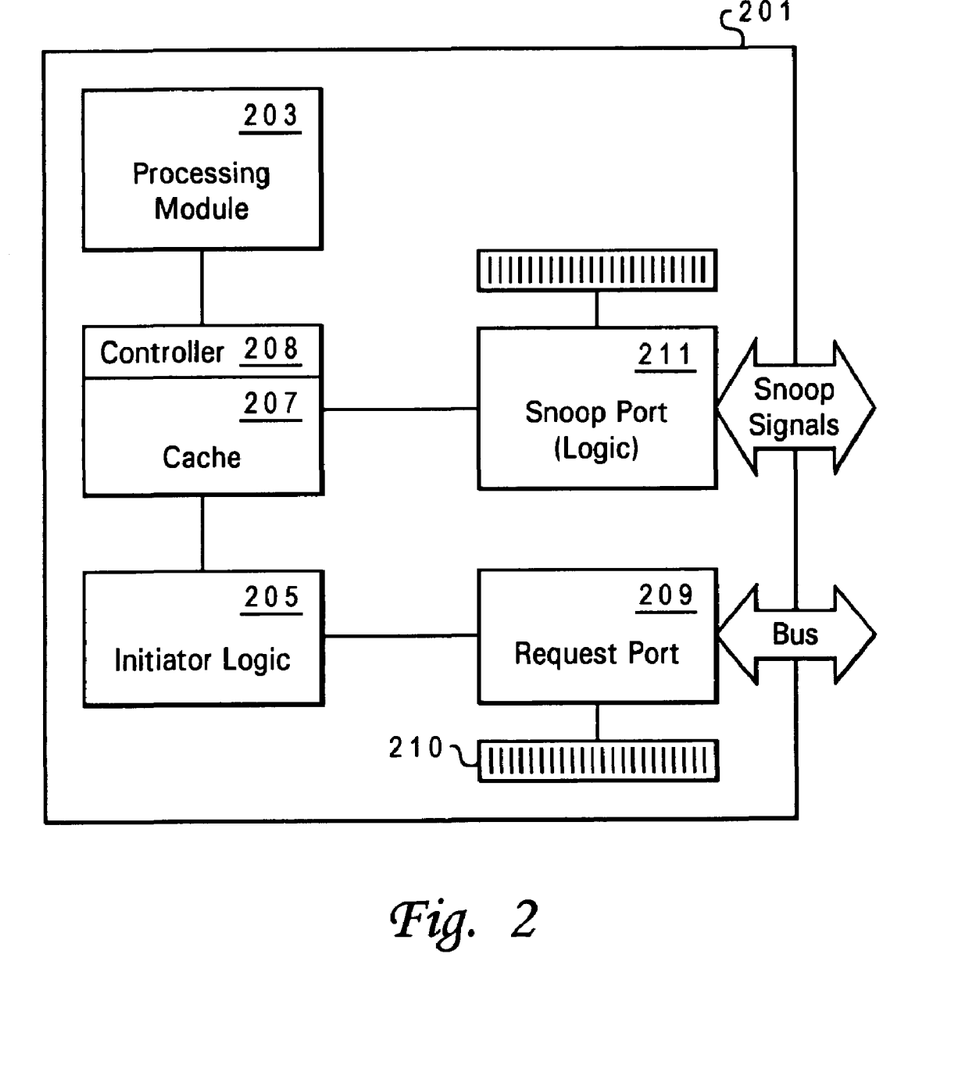
FIG. 2 is a block diagram representation of several internal and on-chip components of a processor utilized to implement several of the features of the present invention.

FIG. 2 illustrates a more detailed view of a processor designed according to the present invention. Processor 201 includes processing module 203 (i.e., logic components by which data/instruction processing actually occurs), initiator request logic 205, and snoop logic (and port) 211. Initiator request logic 205 may be a sub-component of processing module 203, although illustrated as a separate component herein. Similarly, snoop logic 211 may be a sub-component of processing module 203. Finally, processor 201 includes a request port (and logic) 209 for initiating/issuing requests to PLB5 macro via PLB5 bus and an associated request register 210 for tracking requests issued from processor 201. Snoop logic 211 includes snoop enable/disable logic, snoop response logic and a snoop-port for snooping snoopable requests issued by other processors on the PLB5 bus. Snoop logic 211 controls the snoop port and the transmitting and/or receiving of various snoop signals described in FIG. 1B. Snoop logic 211 is the component of processor 201 that controls and implements the processor-side operations of the present invention.

The invention provides the capability within a processor to dynamically enable and/or disable snooping depending on the current activity or operation state of the processor. The invention further provides the capability for the PLB Macro to operate while individual processors enable and/or disable snooping. Utilizing the features of the invention enables processors to save significant amounts of power when snooping is not needed. This further improves system performance since fewer snoopers typically means fewer snoop-related delays.

The invention further addresses systems where each processor is allowed a variable amount of time (number of clock cycles) over which to complete snoops. With these systems, the PLB Macro must wait for a snoop result from each snooping processor. This requires a unique snoop-result signal (or signals) from each processor to the PLB Macro and some sort of register within the PLB macro for tracking which processor signals are received.

Thus the invention supports systems that have an unspecified, multi-clock time-of-flight for some or all of the signals that travel between the processors and the PLB Macro. In order to support the variable latency snoop capability, the invention provides a circuit or logic in the processors, a circuit or logic in the PLB Macro, and the specific wiring topology between them. The wiring topology includes a signal from each processor to the PLB Macro called "SnooperPresent[n]", where "n" goes from 1 to the total number of processors. The wiring topology also includes a signal from the PLB Macro to each processor named SnoopRequest[n]. Each processor includes a circuit/logic that asserts SnooperPresent whenever it is able to respond to a snoop request and de-asserts SnooperPresent whenever the processor can not respond to a snoop Request. According to the illustrative embodiment, the processor responds to all snoop requests received while SnooperPresent is asserted and knows when SnooperPresent is de-asserted.

The PLB Macro includes a circuit/logic that causes it to only assert SnoopRequest[m] when a snoop request is warranted and SnooperPresent[m] is currently asserted at the PLB Macro. The PLB Macro also includes a circuit/logic that waits at each snooping processor, following a snoop request, until either a snoop result is received or SnooperPresent is detected as de-asserted.

According to the illustrative embodiments, the processor detects the need to snoop or not snoop via the software executing on the processor, the state of input pins, or some other method. The processor then activates/de-activates a signal referred to herein as SnooperPresent. Activation of the SnooperPresent signal may include making the signal line high or low, setting an associated bit to "1" or "0", modifying bus logic to recognize or overlook the presence of a snooper, or any other means by which the functional features of the invention may be provided.

Figure 3:
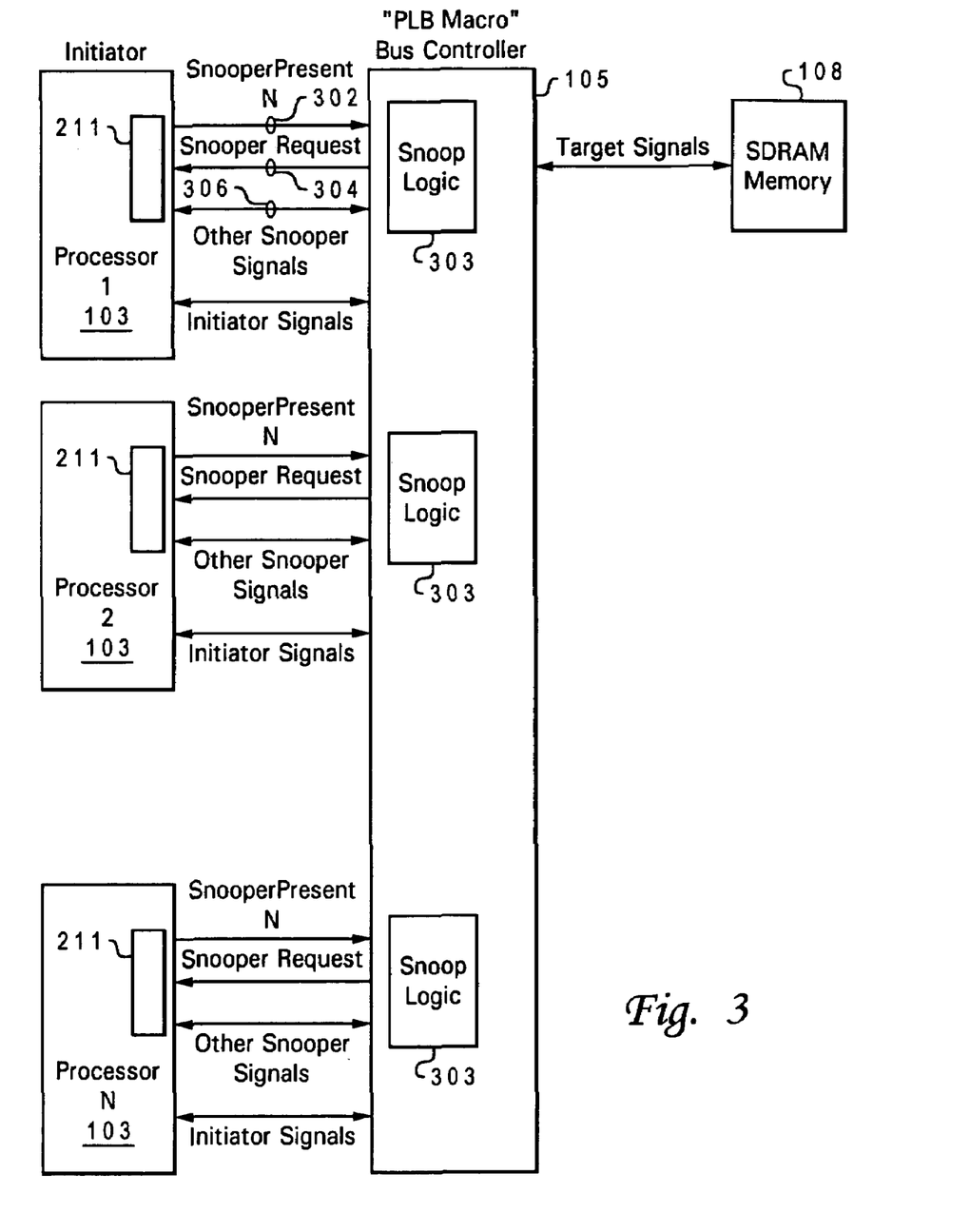
FIG. 3 is a block diagram illustrating a multiprocessor configuration of the SoC of FIG. 1 with snoop control logic and associated bus interconnects according to one implementation of the invention.

FIG. 3 provides a more descriptive view of the snooper signals and logic between processors and the bus controller. Illustrated are three processors 103, which are all snoopers, and a main memory 108, which is the target, all attached to a PLB macro (bus controller) 105. Major components, processors 103, bus controller 105 and main memory 108 are similarly configured as in FIG. 1.

Additionally, both processors 103 and bus controller 105 include additional logic (circuits) utilized to complete the operations of the invention. As shown, processors 1-N 103 comprise snoop enable/disable logic (which is a sub-component of snoop logic 211 illustrated in FIG. 2 and described above) and bus controller comprises snoop disable response logic 303. Although bus controller 105 is illustrated having separate snoop-disable response logic 303 for each processor/snooper, an alternate embodiment provides a single snoop-disable response logic for all snoop disable operations of bus controller 105. Within (or associated with) snoop-disable response logic 303 is a register (not shown) for tracking which snoop responses are received.

Each processor has dedicated SnooperPresent[N] and SnoopRequest[N] signals, and also other snoop signals and initiator signals. FIG. 3 also illustrates the snoop signals (or signal buses), which interconnect processor 103 (or snoop enable/disable logic) with bus controller 105 (or snoop disable response logic 108). The first grouping of buses to and from processor1 are utilized as exemplary buses. These include snooperPresent1 302, snoop request1, which is the snoop request being sent from PLB macro to processor1, and other snoop signals 306. In the embodiment described herein, the other snoop signals and their associated function include: (1) snoopAttributes, which includes type, address and length of the snoop request. These signals are outputs of the PLB Macro and are typically shared among all the processors (i.e., the same signal goes to all processors); (2) snoopResults[N], which is the output of the processor that indicates the results of the snoop; and (3) snoopDone[N], which is the output of the processor that indicates the snoop has completed With this combination of logic components and wiring, a processor that has been responding to snoop requests can stop responding while bus traffic continues. Any snoop request "in flight" when the processor de-asserts SnooperPresent is recognized as complete by the PLB macro when the PLB macro receives a signal indicating the de-assertion of SnooperPresent. In one embodiment, the snoop response tracking register is filled in by the snoop disable logic so that the PLB macro knows not to wait for a response from that particular processor.

With the illustrative embodiment, a processor that has not been responding to snoop requests is able to begin responding while bus traffic continues. No snoop requests are sent to the processor while SnooperPresent is de-asserted. However, as soon as the PLB macro detects the assertion by the processor of SnooperPresent, PLB macro begins forwarding subsequent snoop requests to the associated processor, and that processor knows it has to respond to all snoop requests received after the assertion of SnooperPresent.

Figure 4A:
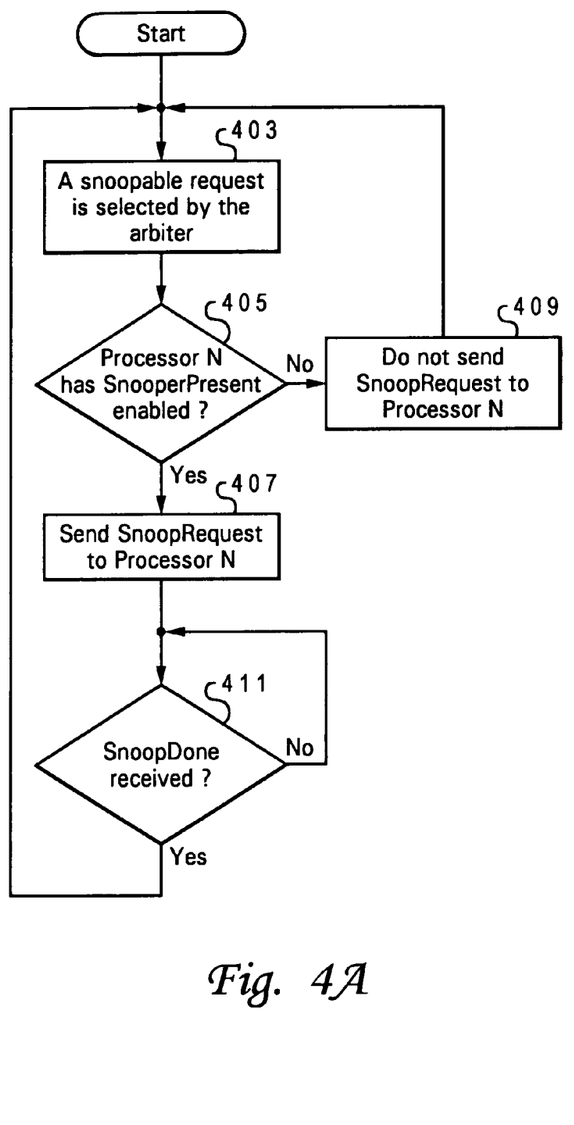
FIGS. 4A and 4B are flow charts of the processes by which snoop enable and disable features are provided according to one embodiment of the present invention.
Figure 4B:
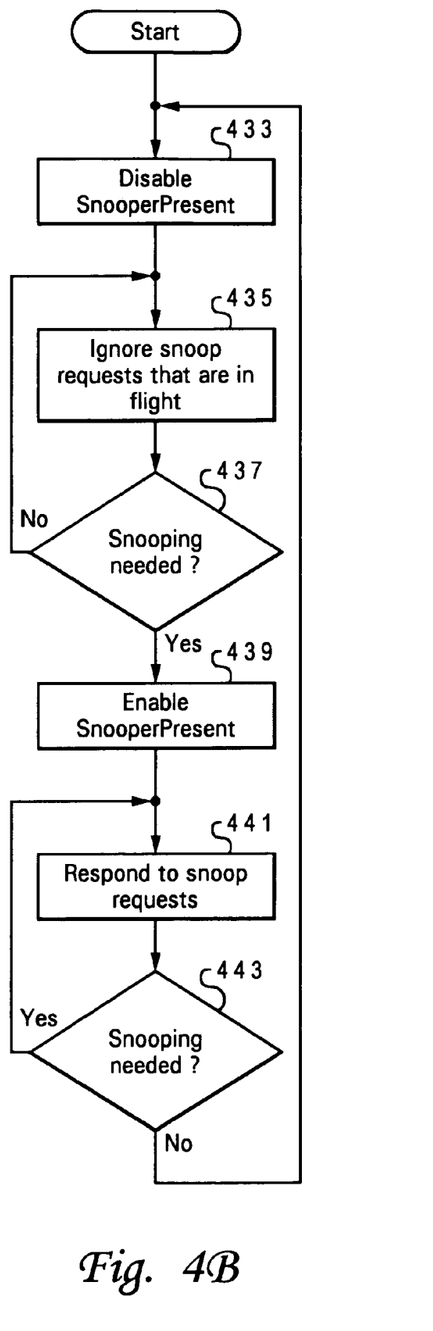

Referring now to FIGS. 4A and 4B, there are illustrated two processes indicating how the features of the present invention are implemented. The process of FIG. 4A provides the PLB macro side of the process and begins at block 403, which indicates selection of a snoopable request by the arbiter. For each processor, a decision is made, as indicated at block 405, whether the processor has SnooperPresent enabled. If SnooperPresent is not enabled, the snoop request is not sent to that processor as shown at block 409. If, however, a processor's SnooperPresent is enabled, the snoop request is sent to the processor as shown at block 407. A determination is then made, as indicated at block 411, whether a snoopDone response has been received. When the snoopDone had been received, the process starts over. The PLB macro continues to wait until the snoopDone is received as indicated by the return to the decision block if the check for snoopDone is negative.

FIG. 4B provides the processor side of the process and begins at block 433, which indicates the processor disabling SnooperPresent which connects the processor to the PLB macro. When SnooperPresent is disabled, any snoop requests that are in flight are ignored as shown at block 435. A processor determination is made, as shown at block 437, whether snooping is needed by the processor. When no snooping is needed by the processor, the processor continues to ignore snoop Requests that are in flight. If, however, the processor determines that snooping is needed, the processor enables SnooperPresent as shown at block 439. The processor then begins responding to snoop requests as indicated at block 441. A determination is made, as indicated at decision block 443, whether snooping is needed by the processor. If snooping is needed, the processor continues to respond to snoop Requests. However, when snooping is not needed, the processor disables SnooperPresent (indicated at block 433) and the process begins again.

The invention prevents the wait for a snoop response if a snoop request is in-flight to a snooping processor when that processor asserts SnooperPresent. The response logic is signaled not to expect a snoop response from that processor. The invention thus avoids erroneous detection by the PLB Macro of SnooperPresent when the de-assertion of SnooperPresent is in-flight. Also, if SnooperPresent is enabled following or concurrently with a broadcast of snoop request, the PLB macro assumes that state of the processor when the snoop request was generated (i.e., SnooperPresent de-asserted) is the valid state. The snoop request is not sent to that processor. Thus, the invention also avoids receiving a snoop response from a processor that was de-asserted when the request was issued.

Figure 5:
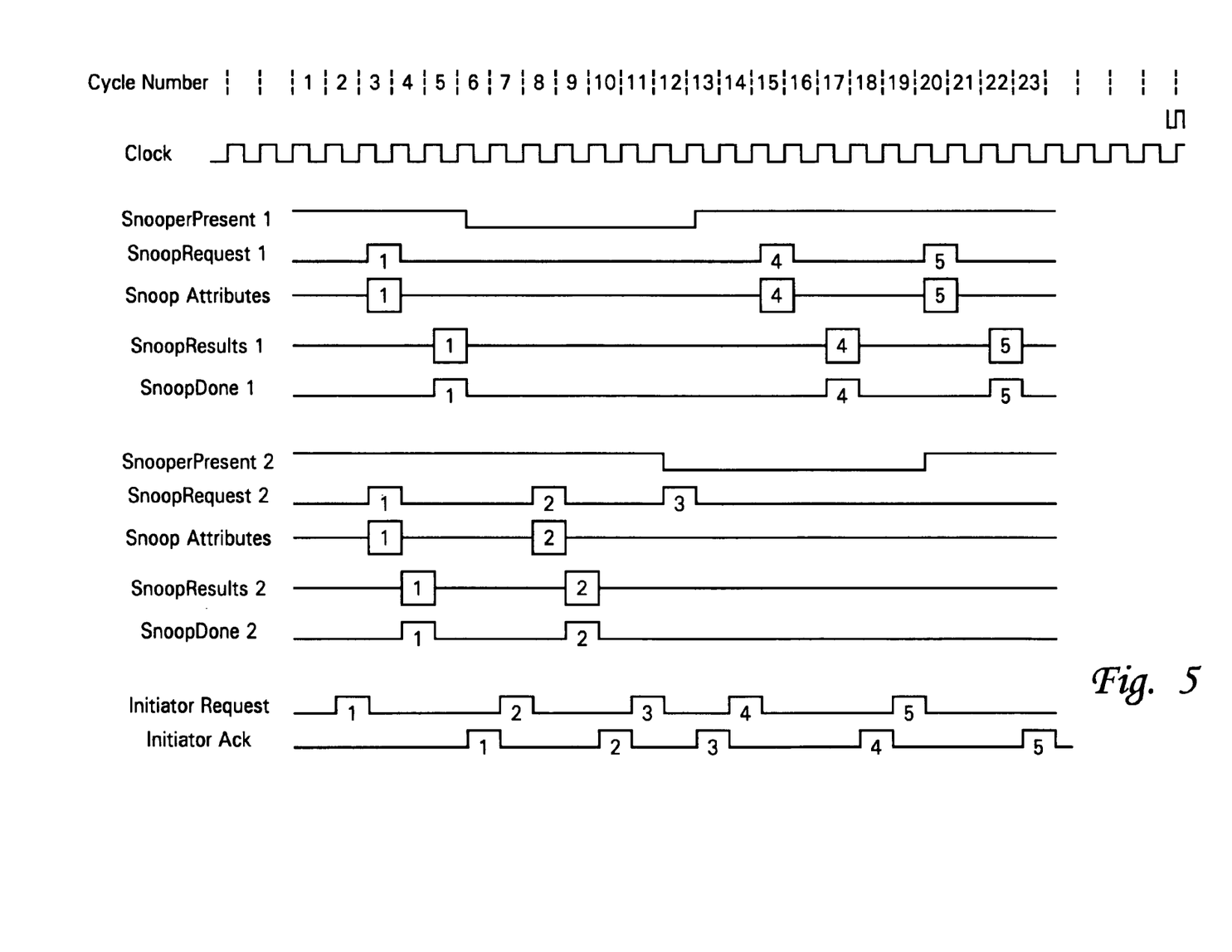
FIG. 5 is a timing diagram illustrating the clock cycles for a process of enabling and disabling snoop operations by a processor according to one embodiment of the invention with one set of possible stimulus.

FIG. 5 is a timing diagram which demonstrates the system clock timing when the circuits/logic in the processors and PLB Macro are transacting a snoop request operation according to the illustrative embodiment of the invention. The actual clock cycles are sequentially numbered at the top of the diagram. Beginning with cycle 1, both processors have their SnooperPresent active. Request1 then begins on cycle 2. Request1 is sent to both processors for snooping via snoopRequest on cycle 3. Processor1 completes the snoop on cycle 4, while processor2 completes the snoop on cycle 5.

The PLB macro which support variable latencies waits for snoop responses from both processors. Once both snoopDone pulses are received, the PLB macro asserts InitiatorAck in cycle 6. Also in cycle 6, processors1 stops snooping, and indicates this by de-asserting snooperPresent1.

Reqeust2 begins is cycle 7. Request2 is sent only to processor2, since processor1 has snoopPresent1 de-asserted. This occurs on cycle 8. Processor2 responds to request2 in cycle 9. The PLB macro completes request2 by asserting InitiatorAck on cycle 10.

Request3 begins in cycle 11. The PLB macro sends request3 to processor2 in cycle12. At the same time (cycle 12), processor2 stops snooping and de-asserts snooperPresent2. Since both processes occur on the same cycle, the de-assertion of snooperPresent2 is "in flight" when the PLB macro sends request3. The PLB macro recognizes that snooperPresent2 is de-asserted, so it does not wait for snoopDone from processor2, and asserts InitiatorAck in cycle 13.

Processor1 begins snooping again in cycle 13, so it asserts snooperPresent1. Request4 begins on cycle 14. The PLB macro sends request4 to processor1 in cycle 14 since it is now the only processor with SnooperPresent asserted. Request4 completes at the snooper on cycle 17 and is then sent to the initiator on cycle 18.

Request5 begins on cycle 19. The PLB Macro sends request5 to processor1 on cycle 20. At the same time, processor2 begins snooping again and asserts snooperPresent2. The PLB Macro waits for a snoop response for processor1 only, since no snoop request was sent to processor2, and the PLB macro receives the snoop response on cycle 22. Then the PLB Macro completes request5 to the initiator on cycle 23.

One design feature for SoC given the various embodiments described herein is the inclusion of an on-chip flip switch or selector feature by which a customer or chip designer may manually select between hardware-enabled assertion/de-assertion of SnooperPresent versus a software (application driven) method. With this design, the flip switch may provide a single on/off bit for the selection between hardware and software or a series of bits programmable by an application running on the SoC, where each value represents one of several possible implementations. Alternatively, the flip switch may allow a system tester to manually turn the snooping function of one of the processors off (or on while testing system snoop operations). The invention thus lends itself to operations wherein a processor undergoes "soft reset".

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, although the invention is described with particular reference to processors, the invention contemplates that all functions described as supported by a "processor" can also be done with any type of snooping bus master. It is therefore contemplated that such modifications can be made without departing from the spirit or scope of the present invention as defined in the appended claims.

What is claimed is:

1. A data processing system comprising:
   a first component capable of issuing a snoopable request;
   a second component that selectively snoops said snoopable request;
   a bus controller interconnecting said first component and said second which operates as a central control for all snoop operations;
   means for said second component to disable a snoop of said snoopable request; and
   means for messaging said bus controller that said snoop has been disabled, wherein said bus controller completes a snoop response registering operation without waiting on a response from the second component.

2. The data processing system of claim 1, wherein said means for messaging includes a snoop signal interconnected between said second component and said bus controller, wherein the snoop signal exists in an enabled state or a disabled state, said enabled state informing the bus controller that the second component is currently snooping snoop requests and said disabled state informing the bus controller that the second component is not currently snooping.

3. The data processing system of claim 2, wherein said second component includes logic for:
dynamically disabling the snoop signal; and
dynamically enabling the snoop signal.

4. The data processing system of claim 3, wherein the second component further comprises logic for determining when to disable and enable the snoop signal based on current operating state and relevant factors.

5. The data processing system of claim 4, wherein the second component further comprises logic for:
snooping requests broadcasted by the bus controller when said snoop signal is enabled; and
generating a snoop response that is sent to bus controller.

6. The data processing system of claim 5, further comprising:
a first interconnect for transmitting said snoop request to at least said second component;
a second interconnect for receiving a snoop response from said second component wherein each snooper within said data processing system has a separate one of said second interconnect for responding to a snoop request; and
wherein said bus controller includes means for differentiating a received snoop response from said second component from another snoop response received from another snooper based on the individualized second interconnect on which said snoop response is received.

7. The data processing system of claim 6, wherein said bus controller comprises:
broadcasting means for issuing a snoop request to all components connected to the bus controller that are snoopers; and
logic for selectively broadcasting said snoop request to only those snoopers with snooper signal enabled.

8. The data processing system of claim 7, said bus controller further comprises:
snoop response registering logic that tracks which snooper has sent a snoop response by monitoring the respective snoop response (second) interconnect;
wherein said registering logic monitors the snoop response interconnect of only active snoopers that do not have a snoop signal disabled; and
said registering logic messages completion of the snoop response once each of those active snoopers have sent a snoop response.

9. The data processing system of claim 8, wherein said registering logic includes means for:
checking whether the snoop signal is enabled when a snoop request is received at the bus controller;
sending said snoop request to said second component when the snoop signal is enabled;
subsequently monitoring the state of the snoop signal; and
when the snoop signal changes state from enabled to disabled prior to a receipt of a snoop response, indicating within a snoop tracking register that the snoop response operation of that snooper has completed.

10. The data processing system of claim 1, wherein said first component is a processor.

11. The data processing system of claim 1, wherein said first component is a snooper from among a processor and a DMA controller.

12. The data processing system of claim 1, wherein the system is configured as a system on a chip (SoC).

13. The data processing system of claim 1, wherein the bus controller is a processor local bus (PLB)5 macro operating according to PLB5 protocol.

14. A system for dynamically changing snoop operations on a data processing system having a plurality of snoopers interconnected to a bus controller, said system comprising:
means for a snoop request originator to generate a snoop request and forward said snoop request to the bus controller for broadcast to the plurality of snoopers;
means for at least one of said plurality of snoopers to dynamically disable its snoop detect and response capability, wherein said means to dynamically disable further comprises means for said at least one snooper to simultaneously signal said bus controller when said snoop capability is disabled; and
means for broadcasting the snoop request to all snoopers except the at least one snooper with said snoop capability disabled.

15. The system of claim 14, further comprising means for waiting for a snoop response only from snoopers whose snoop capability has not been disabled at any time during a snoop operation.

16. A system on a chip (SoC) comprising:
two or more snoopers;
a bus controller;
a bus fabric interconnecting said bus controller and said two or more snoopers; and
means for dynamically disabling a snoop detect and response capability of one of said two or more snoopers;
means for messaging said bus controller that said snoop has been disabled, wherein said bus controller completes a registering of received snoop responses without waiting on a response from any snooper that has disable its snoop capability, wherein a snoop request broadcasted by said bus controller is completed without requiring a snoop response from any snooper that has disabled its snoop detect and response capability.

17. The SoC of claim 16, wherein said means for messaging includes a SnooperPresent signal interconnected between said snooper and said bus controller, wherein the SnooperPresent signal exists in an enable state or a disabled state, said enabled state informing the bus controller that the snooper is currently snooping snoop requests and will provide a snoop response and said disabled state informs the bus controller that the snooper is not currently snooping.

18. The SoC of claim 17, further comprising:
a snoop detect signal for transmitting said snoop request to said snooper;
a snoop response signal for receiving a snoop response from each snooper; and
wherein said bus controller includes means for differentiating a received snoop response from each of said snoopers by tracking which snoop response signal it receives.

19. The SoC of claim 18, wherein said bus controller comprises:
broadcasting means for issuing a snoop request to all snoopers connected to the bus controller; and
logic for selectively broadcasting said snoop request to only those snoopers with SnooperPresent signal enabled.

20. The SoC of claim 19, said bus controller further comprises:
snoop response register that tracks which snooper has sent a snoop response by monitoring the respective snoop response signals of active snoopers that do not have their SnoopPresent signal disabled; and
registering logic that messages completion of the snoop response once all of the active snoopers have sent a snoop response.

* * * * *